F. BERNATZ.
CURRENT OPERATED DEVICE.
APPLICATION FILED FEB. 3, 1913.

1,105,745.

Patented Aug. 4, 1914.
4 SHEETS—SHEET 1.

Inventor
Frank Bernatz

F. BERNATZ.
CURRENT OPERATED DEVICE.
APPLICATION FILED FEB. 3, 1913.

1,105,745.

Patented Aug. 4, 1914.
4 SHEETS—SHEET 2.

Inventor
Frank Bernatz

Witnesses

F. BERNATZ.
CURRENT OPERATED DEVICE.
APPLICATION FILED FEB. 3, 1913.
1,105,745.
Patented Aug. 4, 1914.
4 SHEETS—SHEET 3.
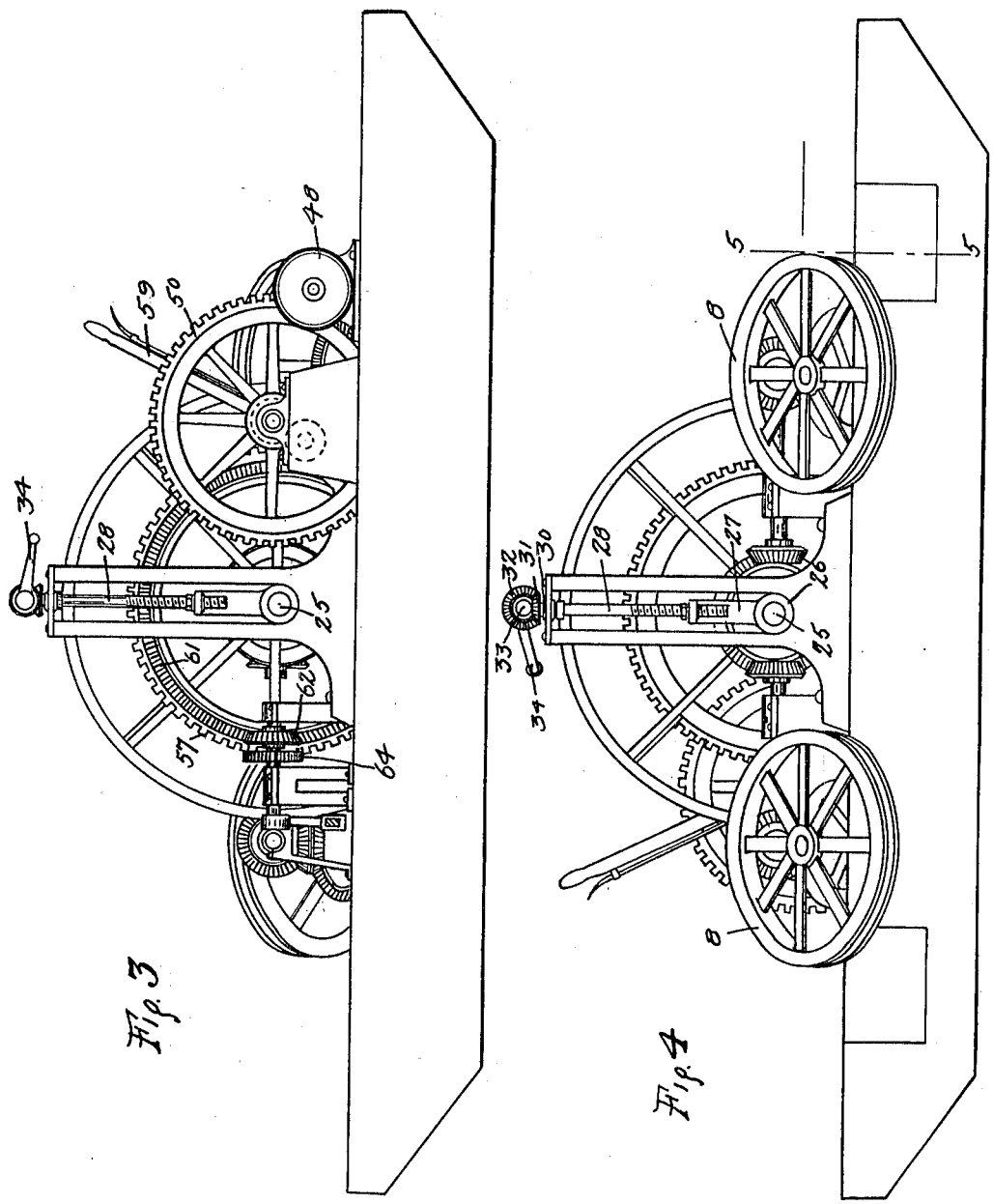
Witnesses
Harold E. Scantlebury
Edna Broyles
Inventor
Frank Bernatz
By
Herbert E. Smith
Attorney F. BERNATZ.
CURRENT OPERATED DEVICE.
APPLICATION FILED FEB. 3, 1913.
1,105,745.
Patented Aug. 4, 1914.
4 SHEETS—SHEET 4.
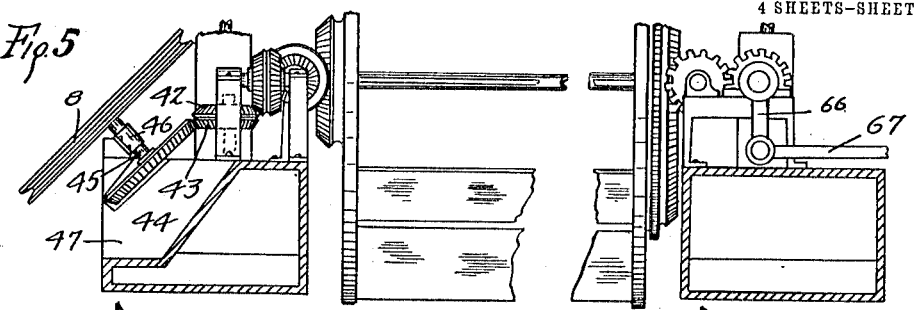
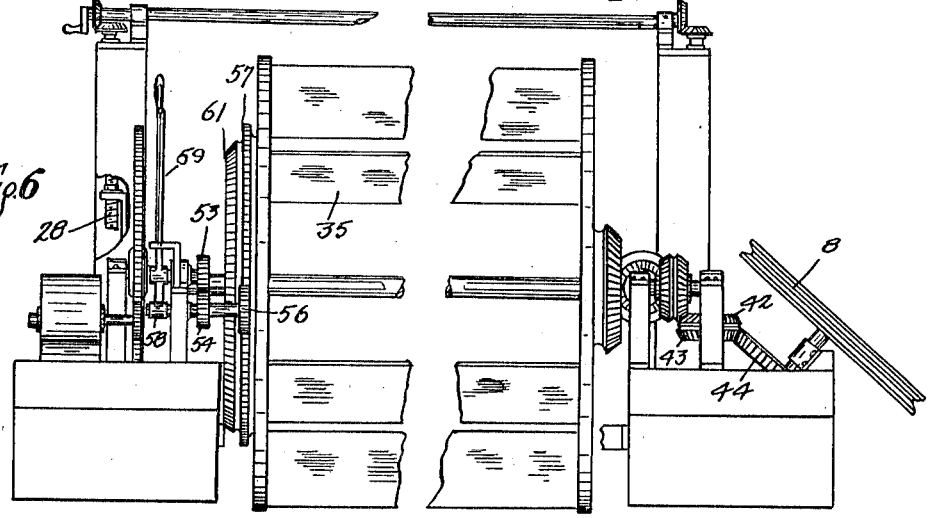
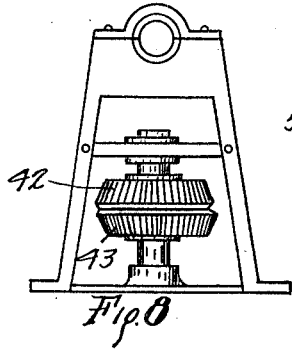
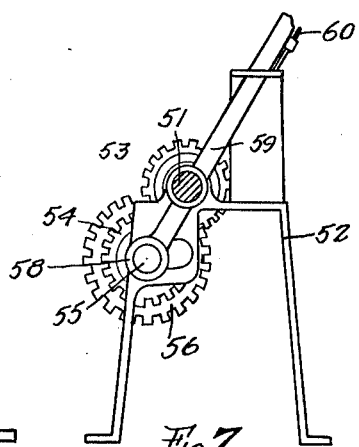
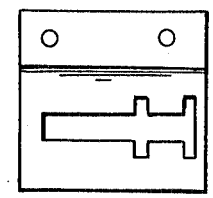
Inventor
Frank Bernatz

UNITED STATES PATENT OFFICE.

FRANK BERNATZ, OF DIXON, MONTANA.

CURRENT-OPERATED DEVICE.

1,105,745. Specification of Letters Patent. Patented Aug. 4, 1914.

Application filed February 3, 1913. Serial No. 745,858.

*To all whom it may concern:*

Be it known that I, FRANK BERNATZ, a citizen of the United States, residing at Dixon, in the county of Sanders and State of Montana, have invented new and useful Improvements in Current - Operated Devices, &c., of which the following is a specification.

The object of my invention is to provide an improved form of current operated prime mover whereby water may be conveyed from a stream to the shore for irrigation purposes, and whereby electricity may be generated and other useful functions performed consistent with the use of a prime mover.

One of the objects of my invention is to provide a prime mover which is especially adapted to operate a circuit conveyer whereby water may be conveyed from a stream to an elevated point on the shore and directed for use in irrigation schemes.

The device of my invention will be more fully described in connection with the accompanying drawings, and will be more particularly pointed out in and by the appended claim.

Figure 1:
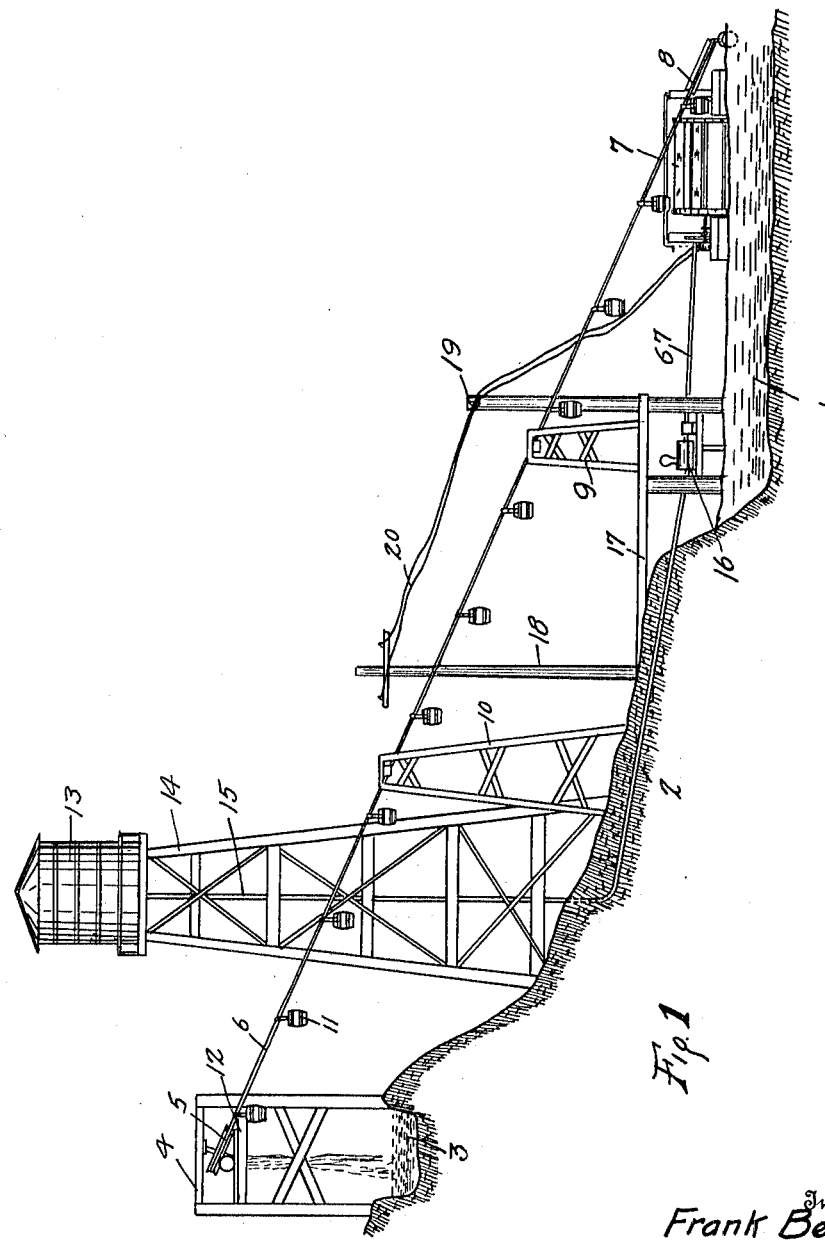
Figure 2:
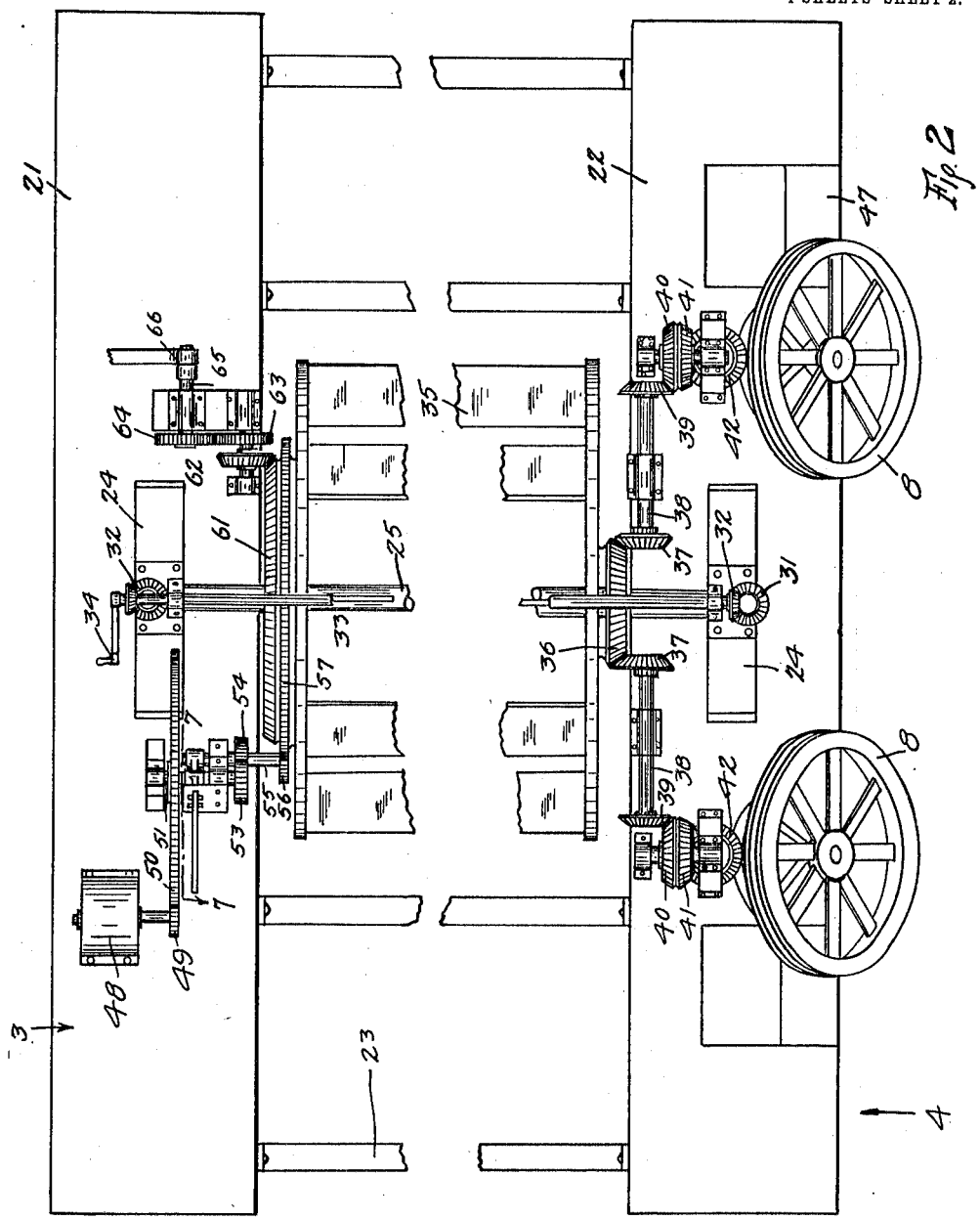

In the drawings:—Figure 1 shows the device of my invention applied to several utilities on a shore line of a running stream. Fig. 2 is a plan view of the prime mover. Fig. 3 is a side view thereof looking in the direction of arrow 3 of Fig. 2. Fig. 4 is a side elevation looking in the direction of arrow 4 in Fig. 2. Fig. 5 is a sectional view on line 5—5 of Fig. 4. Fig. 6 is an end view thereof. Fig. 7 is a sectional view taken on line 7—7 of Fig. 2. Fig. 8 is a detail view of one of the gearing devices. Fig. 9 is a detail view of one of the bearing devices.

Like characters of reference designate similar parts throughout the different figures of the drawings.

As shown in Fig. 1, a running stream is designated at 1 and a portion of the shore is indicated at 2, the shore being illustrated at an elevation above the stream and an irrigation supply ditch being shown at 3. A conveyer tower 4, having a conveyer sheave 5, extends above the supply ditch 3 and supports one end of a rope or cable conveyer 6.

The prime mover mechanism, embodying one feature of my invention, is disposed in the stream 1 and designated at 7, and is provided with one or more sheaves 8 over which the conveyer cable 6 is trained. Intermediate supporting towers 9 and 10 are provided to support the conveyer 6 at points between the sheaves 5 and 8. If the conveyer is for the purpose of conveying water, as in the present instance, bucket 11 may be suspended from the cable or conveyor 6 and the tower 4 may be provided with suitable means, such for instance as a bar 12, for tipping the bucket so as to empty the same into the ditch 3.

A water tank is indicated at 13 and is mounted upon a tower 14 rising from a portion of the shore 2. A supply pipe 15 extends downwardly from the water tower to a pump 16, the manner of operation of which will hereinafter more fully appear. The pump 16 and the support 9 may be mounted upon a wharf 17 extending from the shore 2 outwardly into the stream 1. Poles 18 and 19 are provided for supporting electrical supply wires 20, the purpose of which will hereinafter more fully appear.

Referring more particularly to the construction of the improved current operated prime mover, and to Figs. 2 to 5, inclusive, 21 and 22 designate prime mover supports which may be of the floating type, such as pontoons. The pontoons may be connected, as by bar 23, in suitably spaced relation with respect to each other, and the whole structure may be guyed or anchored in a running stream in any desirable manner. On each of the pontoons is disposed a yoke bearing upright 24 in which a main paddle wheel shaft 25 is carried. The shaft 25 may be provided with hanger bearings 26, having extensions 27 adapted for connection with adjusting devices preferably in the form of threaded shafts 28. The shafts 28 are rotatively mounted and held against longitudinal movement with respect to the upright by bearings 30. Bevel wheels 31 are mounted on the shafts 28 and mesh with bevel wheels 32 on a cross shaft 33. The shaft 33 may be operated by a crank 34 so as to elevate the shaft 25 in the bearing uprights 24. A paddle wheel 35 is mounted on the shaft 25 and a bevel gear 36, forming a part of suitable conveyer transmission gearing, is rigidly mounted on the shaft 25, which may be termed the main wheel shaft. Bevel gear 36 meshes with gears 37 and the latter are mounted on shafts 38 having bevel gears 39. Bevel gears 39 mesh with gears 40, which latter are in the form of double bevels, the other sides 41 of the gears 40 meshing with gears 42. Gears 42, are likewise double beveled and the lower half 43 thereof mesh with sheave gears 44, on shafts 45. The shafts 45 are mounted in bearings 46, at an incline to the vertical, and on the outer and upper ends of said shafts are mounted the conveyer sheaves 8. Adjacent the conveyers sheaves 8, the pontoons are cut away as at 47, to permit passage of the filled buckets without tipping the same.

In one utility of my invention I provide means for generating electric power, and as shown, I mount a generator 48 on the pontoons 22. The generator 48 is provided with a gear 49 which meshes with a gear 50 on shaft 51. Shaft 51 is mounted in an upright frame 52, on the pontoons 22, and the shaft 51 carries a gear 53 which meshes with a gear 54. Gear 54 is mounted upon an adjustable shaft 55 which carries a gear 56. Gear 56 meshes with a gear 57, rigidly mounted on the main shaft 25.

It will be readily seen from the foregoing how transmission is effected from the main shaft 25 to operate the generator 48. In order to cut out the generator 48, at any time desired, I preferably mount the shaft 55 in one end 58, of a lever 59. The lever 59 is rotatably mounted on shaft 51. Means such as a lock bar 60 may serve to hold the lever 59 in the position shown in which the generator is connected up for operation with the wheel 57. If the lever 59 is moved to the left of Fig. 7 then the gear 56 is thrown out of mesh with the gear 57 and the generator 48 is thrown out of operative relation with the prime mover.

In order to operate the pump 16 I provide mechanism for connecting the same in operative relation with the main shaft 25, and as shown, such mechanism may comprise a bevel wheel 61, fast on shaft 25, and meshing with a bevel wheel 62. On the shaft of wheel 62 is mounted a pinion 63 meshing with a pinion 64 on crank shaft 65. A crank 66 operates a pitman 67 which extends to the pump 16.

It will be seen from the foregoing that electricity may be generated and supplied to wires 20, that mechanism may be operated to drive the pump 16 so as to supply water to tank 13, and that the conveyer may be operated to supply water to the irrigation ditch 3, all by a prime mover operated by the current of the stream in which it is disposed.

The device of my invention affords a highly efficient and economical means of utilizing the power of a running stream in an effective manner so as to avoid the cost of obtaining power by utilizing fuel.

While I have herein shown and described one specific embodiment of my invention, I do not wish to be limited thereto except for such limitations as the claim may import.

I claim:—

A water elevating device comprising in combination, an endless cable having two substantially parallel lengths, one or more sheaves disposed at each end of said cable around which the cable passes, said sheaves being placed with their axes of rotation inclined both to the vertical and to the horizontal, said parallel lengths of the cable being arranged so that a line perpendicular to them is substantially horizontal, one or more buckets attached to said cable, flexible connections between said cable and said buckets whereby said buckets may hang vertically when in a free position and may automatically tilt when encountering the water, and means for tilting said buckets after they have been removed from the water.

In testimony whereof I affix my signature in the presence of two witnesses.

FRANK BERNATZ.

Witnesses:
L. T. BUTCHER,
V. N. WEBER.

---

Copies of this patent may be obtained for five cents each, by addressing the "Commissioner of Patents, Washington, D. C."